(12) United States Patent
Funakubo

(10) Patent No.: US 11,998,997 B2
(45) Date of Patent: Jun. 4, 2024

(54) WIRE ELECTRICAL DISCHARGE MACHINE AND MACHINING PROGRAM EDITOR

(71) Applicant: FANUC CORPORATION, Minamitsuru-gun (JP)

(72) Inventor: Ryuuki Funakubo, Yamanashi-ken (JP)

(73) Assignee: FANUC CORPORATION, Yamanashi-Ken (JP)

( * ) Notice: Subject to any disclaimer, the term of this patent is extended or adjusted under 35 U.S.C. 154(b) by 0 days.

(21) Appl. No.: 18/086,040

(22) Filed: Dec. 21, 2022

(65) Prior Publication Data
US 2023/0126897 A1    Apr. 27, 2023

Related U.S. Application Data

(62) Division of application No. 16/811,695, filed on Mar. 6, 2020, now Pat. No. 11,577,332.

(30) Foreign Application Priority Data

Mar. 12, 2019    (JP) .................................. 2019-044915

(51) Int. Cl.
*B23H 7/20*    (2006.01)
*B23H 1/02*    (2006.01)
(Continued)

(52) U.S. Cl.
CPC .............. *B23H 7/20* (2013.01); *B23H 1/024* (2013.01); *B23H 7/06* (2013.01); *G05B 19/414* (2013.01); *G05B 2219/45221* (2013.01)

(58) Field of Classification Search
CPC . B23H 7/20; B23H 1/024; B23H 7/06; B23H 7/065; B23H 1/00; B23H 11/00;
(Continued)

(56) References Cited

U.S. PATENT DOCUMENTS 4,366,359 A      12/1982    Yatomi et al.
10,376,977 B2 *   8/2019    Shirai ................ G05B 19/4097
(Continued)

FOREIGN PATENT DOCUMENTS

EP    2 272 613 A2    1/2011
JP    S53-083192 A    7/1978
(Continued)

OTHER PUBLICATIONS

Notice of Allowance dated Oct. 17, 2022 in U.S. Appl. No. 16/811,695.
(Continued)

*Primary Examiner* — Ramesh B Patel
(74) *Attorney, Agent, or Firm* — MCGINN I.P. LAW GROUP, PLLC

(57) ABSTRACT

A machining program editor that edits a machining program in which a machining path for a wire electrode of a wire electrical discharge machine is set, the machining program editor including: a path determination unit configured to determine whether or not the machining path includes a linear path section that crosses a boundary line between a thick portion of a workpiece and a thin portion of the workpiece, a thickness of the thin portion being smaller than a thickness of the thick portion in an extending direction of the wire electrode; and a path compensator configured to compensate the machining path so as to form, in the thin portion over a predetermined distance, a protrusion projecting outward from the boundary line when the path determination unit determines that the linear path section is included.

7 Claims, 12 Drawing Sheets

(51) Int. Cl.
 *B23H 7/06* (2006.01)
 *G05B 19/414* (2006.01)

(58) Field of Classification Search
 CPC .................. B23H 7/10; G05B 19/414; G05B 2219/45221; G05B 19/40937; G05B 2219/36214; G05B 2219/32161; Y02P 90/02
 See application file for complete search history.

(56) References Cited

U.S. PATENT DOCUMENTS

| | | | |
|---|---|---|---|
| 10,864,587 B2 * | 12/2020 | Hashimoto | B23H 7/08 |
| 11,577,332 B2 * | 2/2023 | Funakubo | B23H 7/20 |
| 2002/0002417 A1 * | 1/2002 | Irie | B23H 7/065 |
| | | | 700/162 |
| 2007/0119821 A1 * | 5/2007 | Kaneko | B23H 7/065 |
| | | | 219/69.12 |
| 2007/0151955 A1 * | 7/2007 | Otsuka | B23H 7/30 |
| | | | 219/69.15 |
| 2010/0017007 A1 * | 1/2010 | Seibold | G06F 30/20 |
| | | | 700/98 |
| 2013/0306377 A1 * | 11/2013 | DiGiovanni | E21B 10/5673 |
| | | | 175/65 |
| 2017/0072490 A1 * | 3/2017 | Hamada | B23H 7/26 |
| 2018/0067003 A1 * | 3/2018 | Michiwaki | G01M 5/0083 |
| 2020/0238413 A1 * | 7/2020 | Ookubo | B23H 7/26 |
| 2020/0290141 A1 * | 9/2020 | Funakubo | B23H 1/024 |
| 2020/0306853 A1 * | 10/2020 | Kubota | B23H 7/20 |
| 2020/0368838 A1 * | 11/2020 | Watanabe | B23H 7/20 |

FOREIGN PATENT DOCUMENTS

| | | |
|---|---|---|
| JP | S54-013096 A | 1/1979 |
| JP | H10-328938 A | 12/1998 |
| JP | 2007-144567 A | 6/2007 |
| JP | 2013-146836 A | 8/2013 |
| JP | 2015-099611 A | 5/2015 |
| TW | 201111080 A | 4/2011 |

OTHER PUBLICATIONS

Office Action dated Aug. 23, 2022 in U.S. Appl. No. 16/811,695.
Extended European Search Report issued Jul. 30, 2020 for European Patent Application No. 20162030.9.
Taiwanese Search Report dated Aug. 19, 2021 for European Patent Application No. 109107742 with partial translation.

* cited by examiner

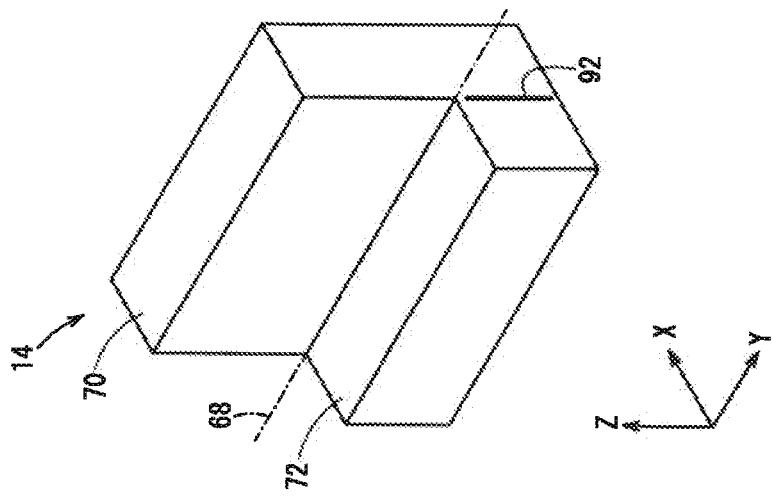
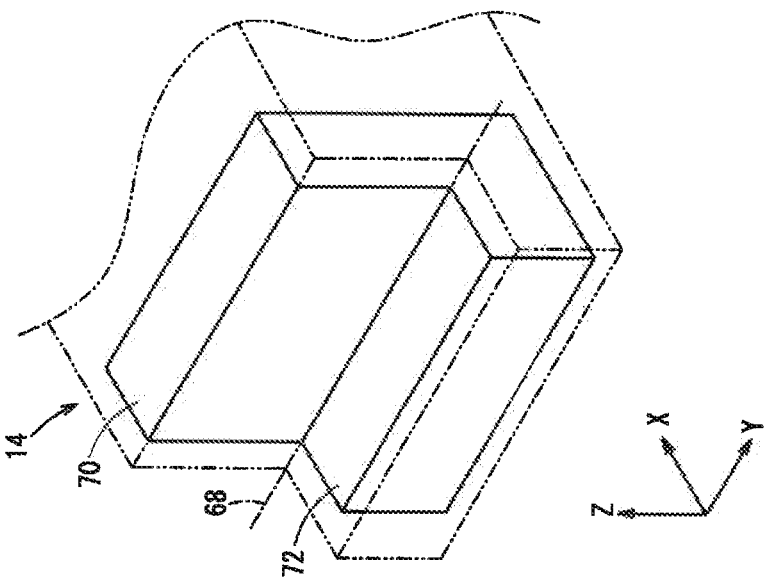

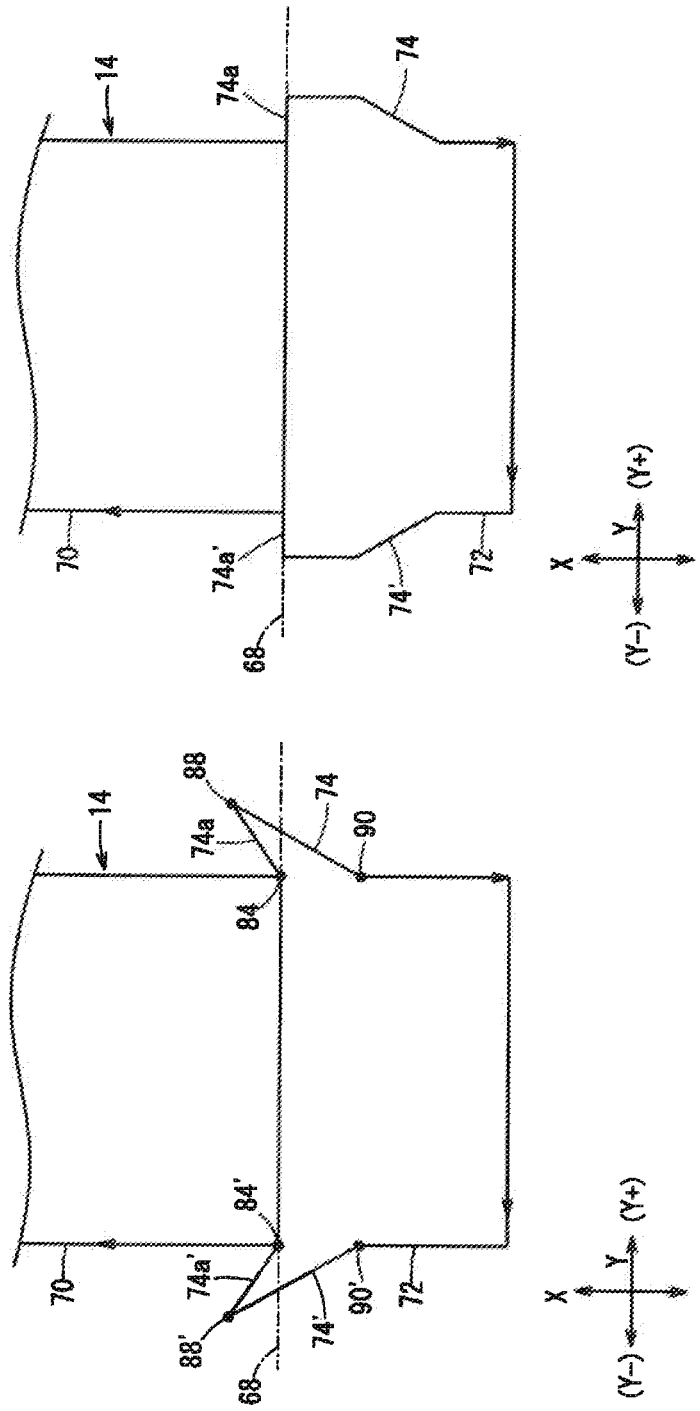

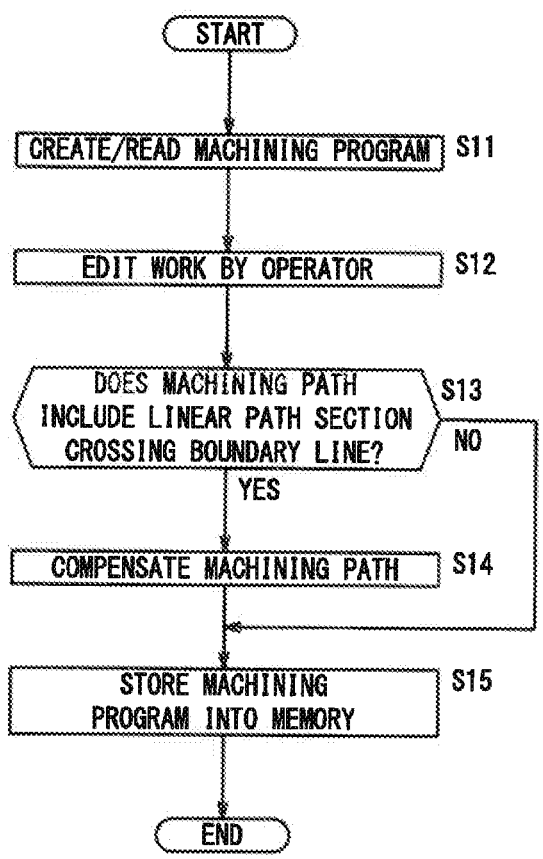

US 11,998,997 B2

WIRE ELECTRICAL DISCHARGE MACHINE AND MACHINING PROGRAM EDITOR

CROSS-REFERENCE TO RELATED APPLICATION

The present application is a DIVISIONAL Application of U.S. patent application Ser. No. 16/811,695, filed on Mar. 6, 2020, which is based upon and claims the benefit priority from Japanese Patent Application No. 2019-044915 filed on Mar. 12, 2019, the contents of which are incorporated herein by reference.

BACKGROUND OF THE INVENTION

Field of the Invention

The present invention relates to a wire electrical discharge machine and a machining program editor.

Description of the Related Art

A wire electrical discharge machine is a type of machine tool. A wire electrical discharge machine performs electrical discharge machining on a workpiece by generating discharge sparks between a wire electrode and the workpiece while producing relative motion between the wire electrode and the workpiece. Thereby, the object to be processed, i.e., the workpiece, is machined into a designated shape.

The wire electrode of the wire electrical discharge machine relatively moves along a machining path with respect to the workpiece during the implementation of electrical discharge machining. The machining path is set in a program that is loaded and executed by the wire electrical discharge machine. Thus, the operator can machine the workpiece into a desired shape.

SUMMARY OF THE INVENTION

Electrical discharge machining performed by the wire electrical discharge machine may have a problem when the workpiece has a step at which the thickness changes. The problem is, for example, reduced accuracy of electrical discharge machining at the step in the workpiece, disconnection of the wire electrode at the step and the like. To deal with the above problem, Japanese Laid-Open Patent Publication No. 2007-144567 proposes a configuration in which the machining condition is automatically changed so as to be suitable for the positions of steps. Examples of the machining condition include a set value of the voltage applied to the wire electrode.

However, when a setting of the machining condition is changed during electrical discharge machining, the amount of removal from the workpiece during electrical discharge changes abruptly due to the change of the setting. As a result, unintended streak-like flaws may form on the surface of the workpiece after the electrical discharge machining. In this way, changing only the machining condition at the position of the step cannot achieve the operator's intended accuracy in machining the workpiece.

It is therefore an object of the present invention to provide a wire electrical discharge machine and a machining program editor, which enables implementation of electrical discharge machining while suppressing generation of flaws around a step in a workpiece.

One aspect of the present invention resides in a wire electrical discharge machine that machines a workpiece using a wire electrode, the wire electrical discharge machine comprising; a drive control unit configured to move the wire electrode relative to the workpiece along a machining path set in a machining program; a path determination unit configured to determine whether or not the machining path includes a linear path section that crosses a boundary line between a thick portion of the workpiece and a thin portion of the workpiece, a thickness of the thin portion being smaller than a thickness of the thick portion in an extending direction of the wire electrode; and a path compensator configured to compensate the machining path so as to form, in the thin portion over a predetermined distance, a protrusion projecting outward from the boundary line when the path determination unit determines that the linear path section is included.

Another aspect of the present invention resides in a machining program editor that edits a machining program in which a machining path for a wire electrode of a wire electrical discharge machine is set, the machining program editor comprising: a path determination unit configured to determine whether or not the machining path includes a linear path section that crosses a boundary line between a thick portion of a workpiece and a thin portion of the workpiece, a thickness of the thin portion being smaller than a thickness of the thick portion in an extending direction of the wire electrode; and a path compensator configured to compensate the machining path so as to form, in the thin portion over a predetermined distance, a protrusion projecting outward from the boundary line when the path determination unit determines that the linear path section is included.

According to the present invention, it is possible to provide a wire electrical discharge machine and a machining program editor, which enable implementation of electrical discharge machining while suppressing generation of flaws around a step in a workpiece.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9A is a perspective view showing the workpiece when the final finishing step has been completed;

FIG. 9B is a perspective view showing an example of a workpiece that has been subjected to a related art machining process;

FIG. 10A is a top view showing a workpiece that has been completed up to a machining step one step before a finishing step in a modified example 1-1;

FIG. 103 is a top view showing another example of a workpiece machined in the modified example 1-1;

FIG. 12 is a flowchart for explaining an exemplary flow of a process performed by the machining program editor of the second embodiment.

DESCRIPTION OF THE PREFERRED EMBODIMENTS

Figure 1:
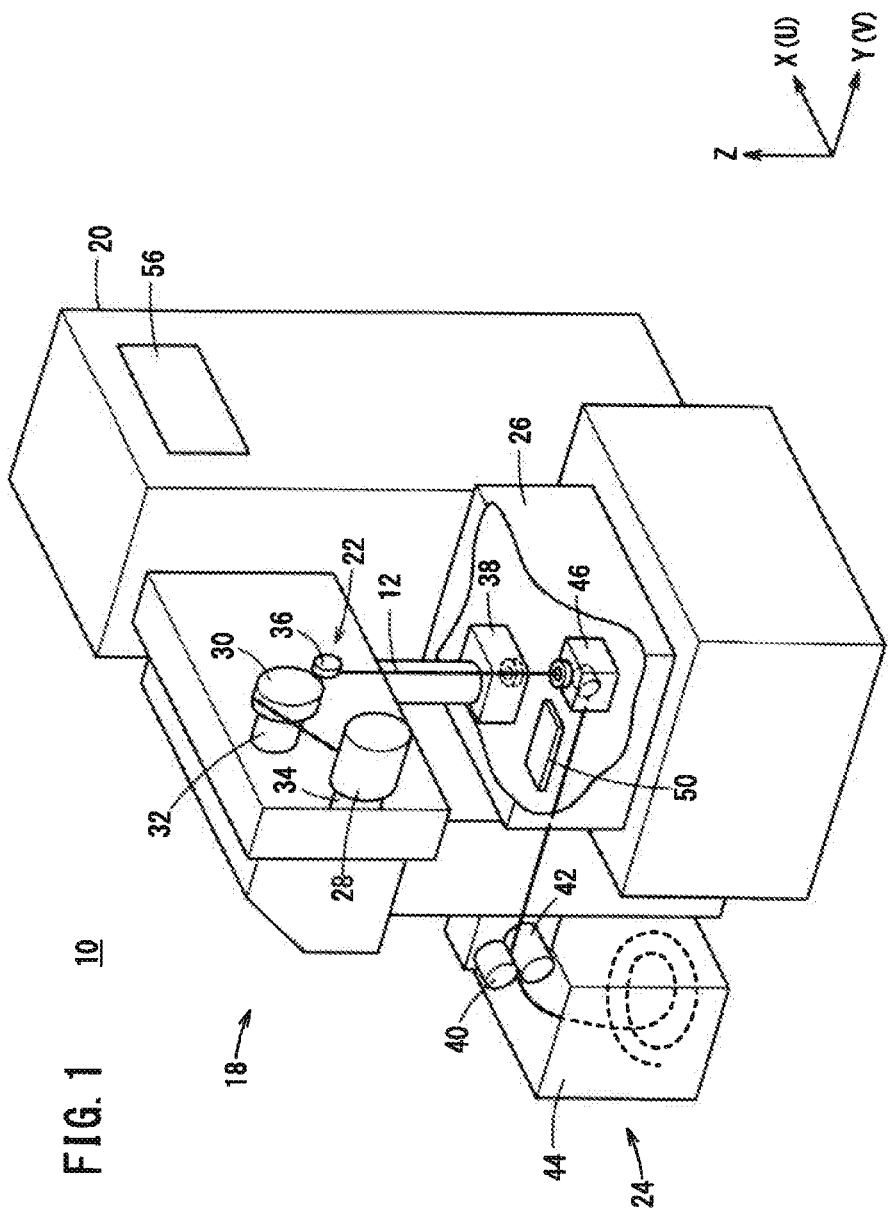
FIG. 1 is an overall configuration diagram of a wire electrical discharge machine according to a first embodiment.

Hereinafter, preferred embodiments of the present invention will be detailed below by describing preferred embodiments with reference to the accompanying drawings. The orientations of the axes in the following description are as shown in the drawings.

First Embodiment

FIG. 1 is an overall configuration diagram of a wire electrical discharge machine 10 according to the first embodiment.

The wire electrical discharge machine 10 is a machine tool that performs electrical discharge machining on a workpiece 14 (FIG. 5) along a machining path 16 (FIG. 6) by generating discharge sparks between a wire electrode 12 and the workpiece 14 while relatively moving the wire electrode 12 with respect to the workpiece 14. Hereinbelow, the "wire electrical discharge machine 10" is also simply referred to as "the machine 10". "Electrical discharge machining" is also simply referred to as "machining".

The machine 10 includes a main body 18 and a controller 20. The main body 18 includes a supply system 22 that feeds the wire electrode 12 to the workpiece 14 which is an object to be machined, a collection system 24 that collects the wire electrode 12 having passed through the workpiece 14, and a tank 26 for storing a dielectric working fluid.

The supply system 22 includes a wire bobbin 28, a brake roller 30, a brake motor 32, a torque motor 34, a tension detector 36 and a first wire guide 38. The wire electrode 12 is wound on the wire bobbin 28, which is applied with torque by the torque motor 34. The brake roller 30 applies a braking force by friction to the wire electrode 12 as it is applied with a brake torque by the brake motor 32. The tension detector 36 detects the tension of the wire electrode 12. The first wire guide 38 is immersed in the dielectric working fluid inside the tank 26 and guides the wire electrode 12 above the workpiece 14.

The collection system 24 includes a pinch roller 40, a feed roller 42, a wire collection box 44, and a second wire guide 46. The pinch roller 40 and the feed roller 42 are arranged to pinch and transfer the wire electrode 12, and the transferred wire electrode 12 is collected into the wire collection box 44. The second wire guide 46 is immersed in the dielectric working fluid inside the tank 26, and guides the wire electrode 12 below the workpiece 14.

Figure 2:
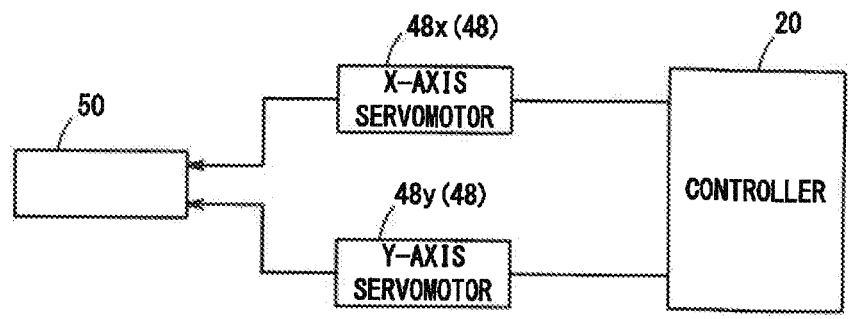
FIG. 2 is a block diagram showing part of the electrical configuration of the wire electrical discharge machine according to the first embodiment.

FIG. 2 is a block diagram showing part of the electric configuration of the wire electrical discharge machine 10 according to the first embodiment.

The machine 10 can transfer the wire electrode 12 in the Z-axis direction by the supply system 22 and the collection system 24. Further, the first wire guide 38 and the second wire guide 46 are each connected to a U-axis servomotor and a V-axis servomotor (not shown). Thereby, the machine 10 can move each of the first wire guide 38 and the second wire guide 46 along the U axis or the V axis (FIG. 1).

A support portion 50 for supporting the workpiece 14 is provided inside the tank 26 (see FIG. 1). The support portion 50 is, for example, a table. In this embodiment, the wire electrode 12 moves relatively as the support portion 50 moves in actuality. In order to realize this, in the present embodiment, an X-axis servomotor 48$x$ and a Y-axis servomotor 48$y$ are connected to the support portion 50. The X-axis servomotor 48$x$ is a servomotor 48 that rotates to move the support portion 50 along the X-axis. The Y-axis servomotor 48$y$ is a servomotor 48 that rotates to move the support portion 50 along the Y-axis.

Figure 3:
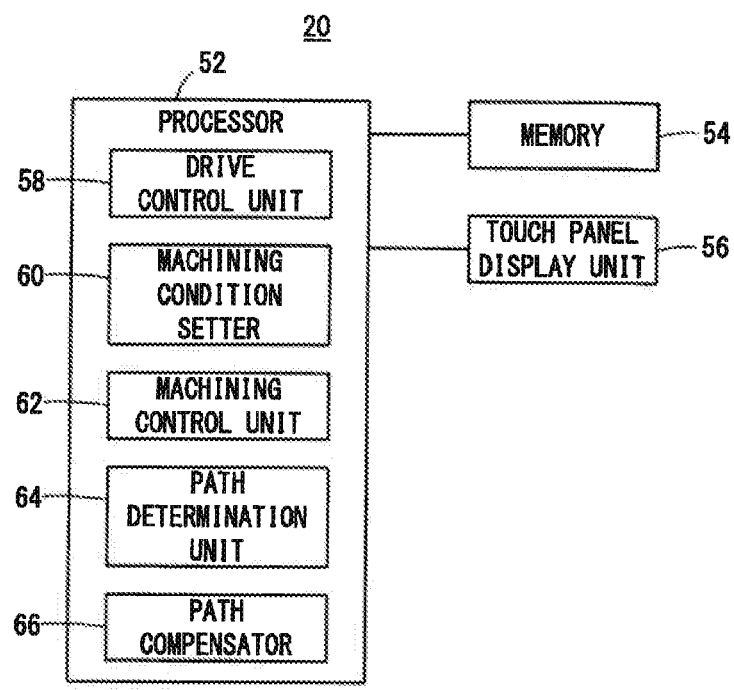
FIG. 3 is a block diagram schematically showing the configuration of a controller according to the first embodiment.

FIG. 3 is a block diagram schematically showing the configuration of the controller 20 of the first embodiment.

The controller 20 of the machine 10 is, for example, a CNC (Computer Numerical Control Unit), and includes a processor 52 capable of executing arithmetic processing and a memory 54 storing a machining program. Further, the controller 20 includes operation buttons for sending instructions to the machine 10 and a touch panel display unit 56 for displaying machining progress information and the like on a screen.

"The machining program" is a program in which the route of the relative movement of the wire electrode 12 when performing electrical discharge machining on the workpiece 14 is set. The "route of the relative movement of the wire electrode 12 when performing electrical discharge machining on the workpiece 14" may be also referred to as "the machining path 16". The machining program is created by the operator prior to the implementation of machining.

The screen of the touch panel display unit 56 is, for example, a liquid crystal screen equipped with a touch panel. The operation buttons and information displayed on the screen of the touch panel display unit 56 may be changed as appropriate. The operator can send instructions to the supply system 22 and the collection system 24 of the main body 18 through the touch panel display unit 56. Examples of the instructions the operator sends to the main body 18 include a command to start machining or a command to change a setting of the machining condition for electrical discharge machining. Thus, the touch panel display unit 56 not only functions to notify information to the operator but also acts an operation unit for the operator to give instructions to the machine 10.

The controller 20 further includes a drive control unit 58 for controlling the relative movement of the wire electrode 12 based on the machining path 16 read from the machining program, a machining condition setter 60 for setting the machining conditions, and a machining control unit 62 for controlling implementation of electrical discharge machining according to the machining condition. In the present embodiment, each of the drive control unit 58, the machining condition setter 60 and the machining control unit 62 is one of the functional units included in the processor 52.

The drive control unit 58 controls the rotation of each of the X-axis servomotor 48$x$ and the Y-axis servomotor 48$y$ based on the machining program to move the support portion 50 supporting the workpiece 14. Thereby, the wire electrode 12 relatively moves along the machining path 16 designated in the machining program.

The machining condition setter 60 sets the machining condition for machining the workpiece 14 by reading a predetermined program stored in the memory 54 or receiving operator's instructions. In the present embodiment, "the machining condition" indicates a combination of control parameters for specifying the details in controlling spark machining, including the magnitude of the voltage applied to the wire electrode 12 and the pause time of application of the voltage.

For example, the machining control unit 62 applies voltage to the wire electrode 12 based on the machining condition determined by the machining condition setter 60. As a result, electrical discharges are generated between the wire electrode 12 and the workpiece 14 in the dielectric working fluid stored in the tank 26. Thus, by generating sparks, the machine 10 can remove unnecessary parts close to the wire electrode 12 from the workpiece 14.

When machining on the workpiece 14, the machine 10 causes the machining control unit 62 to generate electrical discharges while making the drive control unit 58 produce relative movement of the wire electrode 12 along the machining path 16. The machining conditions including the voltage applied to the wire electrode 12 when machining are set by the machining condition setter 60.

The machine 10 according to the present embodiment includes a path determination unit 64 and a path compensator 66 in addition to the drive control unit 58, the machining condition setter 60 and the machining control unit 62. The path determination unit 64 and the path compensator 66 are one of the functional units included in the processor 52, like the drive control unit 58 and the like.

The path determination unit 64 determines whether the machining path 16 includes a linear path section crossing a boundary line 68. Here, the boundary line 68 is a line that lies along the boundary that separates the workpiece 14 into a thick portion 70 and a thin portion 72 whose thickness in the extending direction of the wire electrode 12 is smaller than that of the thick portion 70. When making determination, the path determination unit 64 may refer to information stored in the memory 54 as appropriate. The information the path determination unit 64 refers to is, for example, the machining program in which the machining path 16 is set, and CAD data indicating the shape of the workpiece 14.

Figure 8:
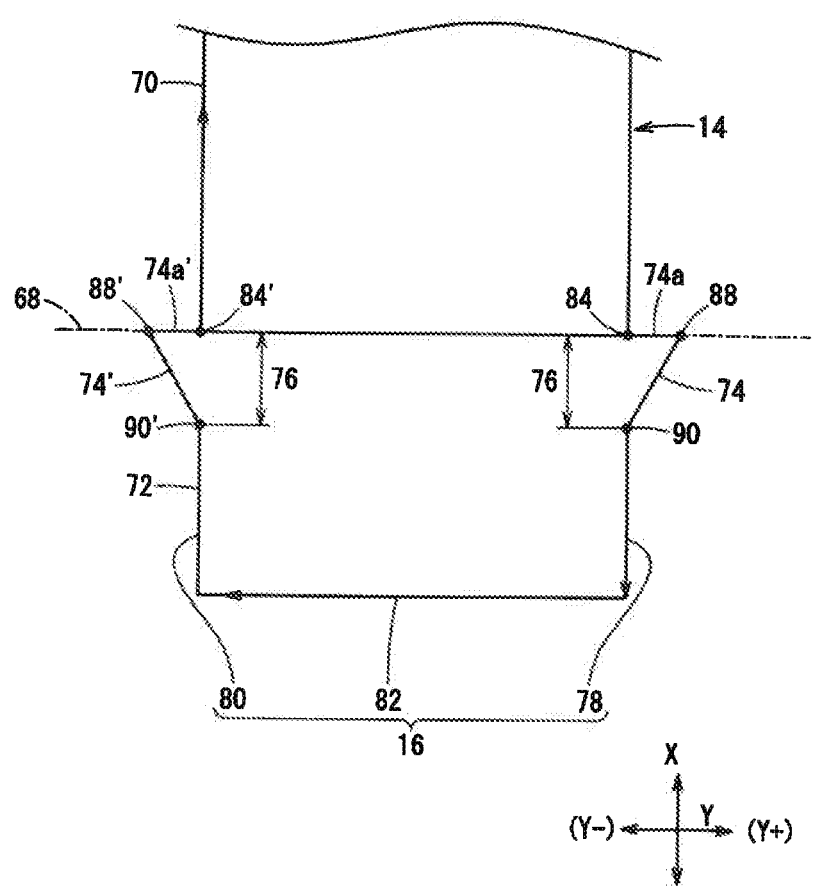
FIG. 8 is a top view showing the workpiece that has been completed up to a machining step one step before a finishing step.

The path compensator 66 compensates the machining path 16 according to the result of the determination from the path determination unit 64. Specifically, the path compensator 66 compensates the machining path 16 so as to form, in the thin portion 72 over a predetermined distance 76, a protrusion 74 projecting outward from the boundary line 68 (FIG. 8). Here, the "outward" is the direction that is orthogonal to both the direction of the machining path 16 and the extending direction of the wire electrode 12, and that goes toward the nearest endface of the workpiece 14 as viewed from the point on the machining path 16.

Figure 4:
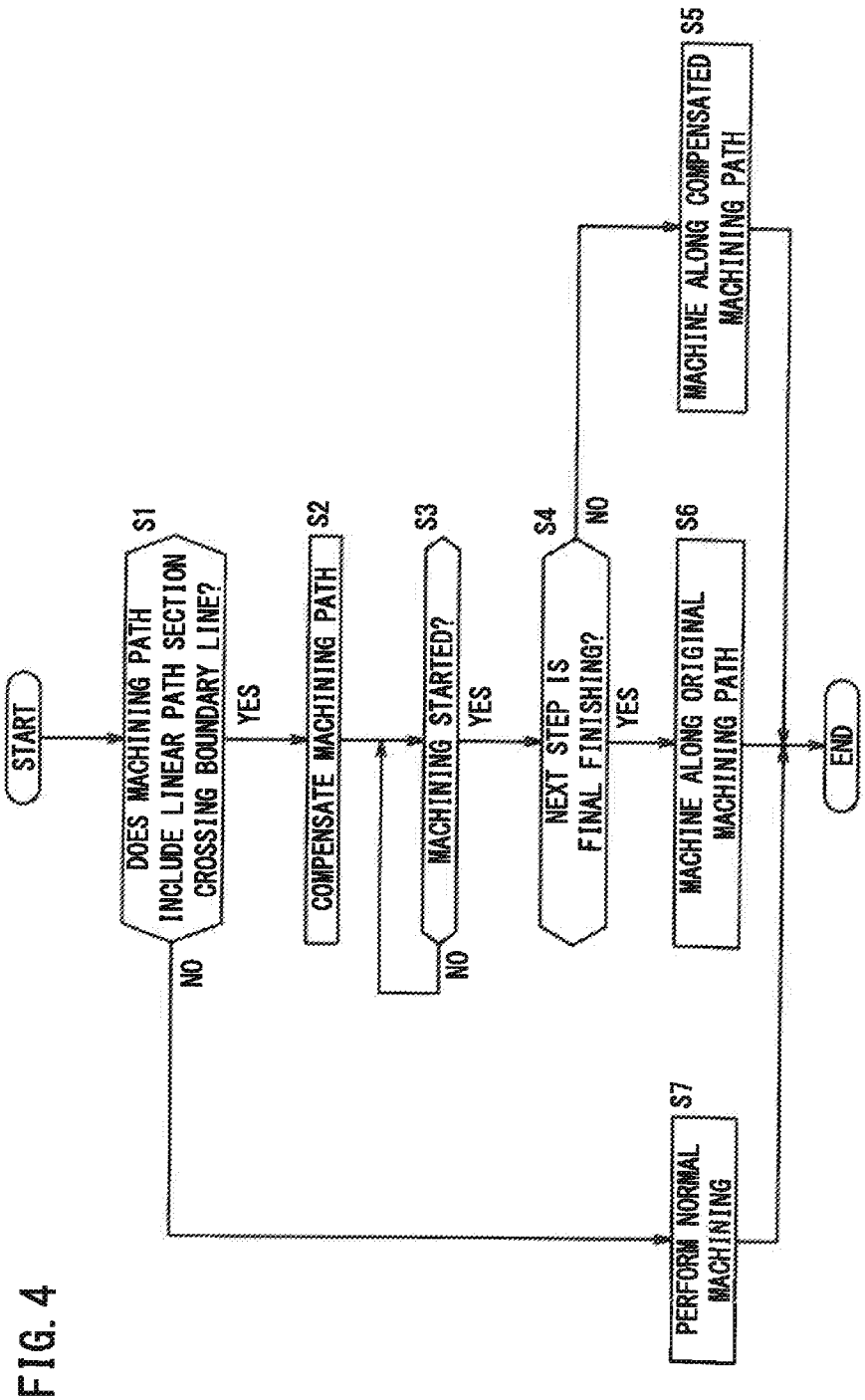
FIG. 4 is a flowchart for explaining an example of a flow of processing performed by the wire electrical discharge machine according to the first embodiment.

FIG. 4 is a flowchart for explaining an example of a flow of processing performed by the wire electrical discharge machine 10 according to the first embodiment;

Now, an example of a flow of processing executed by the machine 10 when machining the workpiece 14 will be described with reference to FIG. 4. The process shown in FIG. 4 is started when, for example, the operator selects a machining program to start machining (START).

Figure 5:
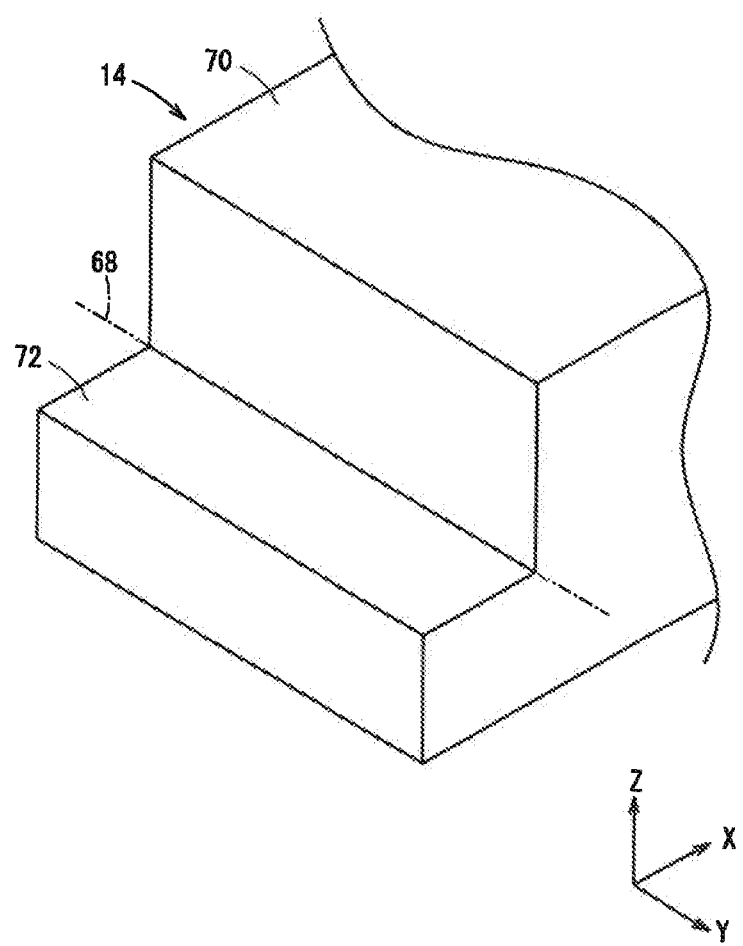
FIG. 5 is a perspective view of a workpiece in the first embodiment.
Figure 6:
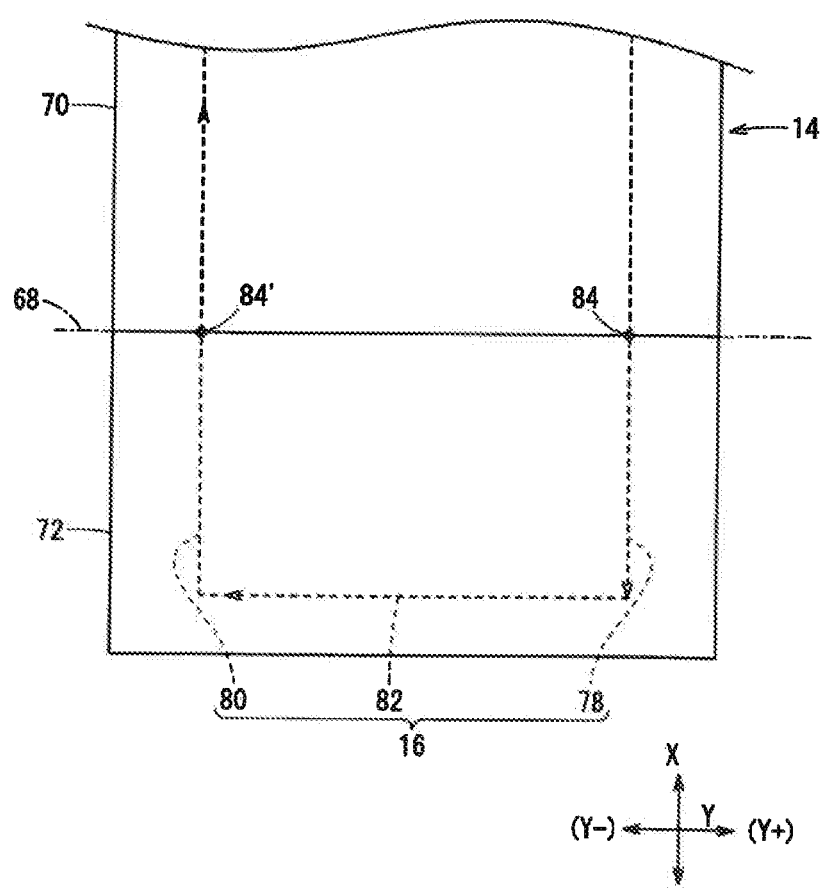
FIG. 6 is a top view of the workpiece in the first embodiment.

FIG. 5 is a perspective view of a workpiece 14 of the first embodiment. FIG. 6 is a top view of the workpiece 14 of the first embodiment.

For example, as shown in FIG. 5, it is assumed that the workpiece 14 has a step in the Z-axis direction (the extending direction of the wire electrode 12). In this case, the workpiece 14 includes two portions separated at the boundary line 68 where the step is formed, i.e., the thick portion 70 and the thin portion 72 whose thickness in the Z-axis direction is relatively smaller than that of the thick portion 70.

As described above, the path determination unit 64 determines whether the machining path 16 includes a linear path section crossing the boundary line 68 (Step S1).

It is assumed that the workpiece 14 has the shape as shown in FIGS. 5 and 6 and that the machining path 16 shown in FIG. 6 has been set in the machining program. As understood from FIG. 6, the machining path 16 includes a first linear path section 78 parallel to the X-axis, a second linear path section 80 also extending parallel to the X-axis direction and a third linear path section 82 that extends parallel to the Y-axis to connect the first linear path section 78 and the second linear path section 80. Among these, the first linear path section 78 and the second linear path section 80 intersect the boundary line 68 between the thick portion 70 and the thin portion 72 at intersections 84 and 84', respectively.

Accordingly, the path determination unit 64 determines that the machining path 16 illustrated in FIG. 6 "includes a linear path section crossing the boundary line 68". Here, the "linear path section crossing the boundary line 68" refers to each of the first linear path section 78 and the second linear path section 80.

It should be noted that the path determination unit 64 does not need to make a determination for the boundary lines 68 of all of the steps of the workpiece 14. For example, the path determination unit 64 may make a determination only for the steps having a thickness difference equal to or greater than a predetermined amount at step S1. The predetermined amount here may be an amount designated in advance by the operator.

If it is determined "NO" at step S1, the machine 10 performs normal machining (step S7). The normal machining refers to a process in which a roughing step and a finishing step are performed along the original machining path 16. The machine 10 may wait for the execution of step S7 until the operator instructs the start of the machining.

Figure 7:
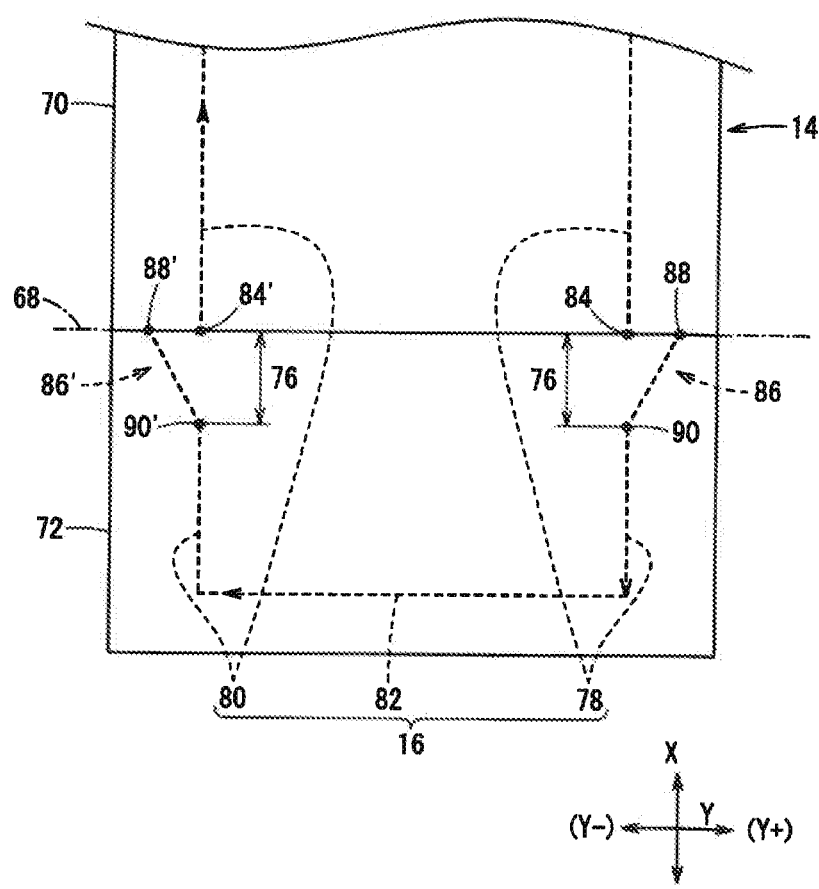
FIG. 7 is a top view of the workpiece showing a machining path compensated by a path compensator according to the first embodiment.

FIG. 7 is a top view of the workpiece 14 having the machining path 16 compensated by the path compensator 66 according to the first embodiment.

When the path determination unit 64 determines that a linear path section crossing the boundary line 68 is included, the path determination unit 64 outputs the determination result to the path compensator 66. Then, the path compensator 66 compensates the machining path 16 such that the protrusion 74 (FIG. 8) projecting outward from the boundary line 68 is formed in the thin portion 72 over the predetermined distance 76 (Step S2). Here, the Y-axis positive direction is the outward direction on the first linear path section 78 side of the workpiece 14, whereas the Y-axis negative direction is the outward direction on the second linear path section 80 side of the workpiece 14.

By compensating the machining path 16, the path compensator 66 replaces a part of the first linear path section 78 with a compensated path section 86. Similarly, the path compensator 66 replaces a part of the second linear path section 80 with a compensated path section 86. Hereinafter, for distinction, the compensated path section 86 that replaces a predetermined range of the second linear path section 80 may also be referred to as a "compensated path section 86'".

The compensated path section 86 generated to replace a part of the first linear path section 78 starts from the intersection 84. The compensated path section 86 further includes, as a halfway point, a first point 88 located on the outer side of the intersection 84, and includes, as an end point, a second point 90 that is a point on the first linear path section 78 in the thin portion 72 and is separated by the predetermined distance 76 from the intersection 84. In this embodiment, the first point 88 resides on the boundary line 68. Therefore, a line segment connecting the intersection 84 and the first point 88 is orthogonal to the first linear path section 78. The compensated path section 86 in this embodiment is the shortest route formed by connecting the intersection 84, the first point 88 and the second point 90 in this order.

The compensated path section 86' generated to replace a part of the second linear path section 80 ends at the intersection 84'. The compensated path section 86' further includes, as a halfway point, a first point 88' located on the outer side of the intersection 84', and includes, as a start point, a second point 90' that is a point on the second linear path section 80 in the thin portion 72 is separated by the predetermined distance 76 from the intersection 84'. In the present embodiment, the first point 88' resides on the boundary line 68. Therefore, a line segment connecting the intersection 84' and the first point 88' is orthogonal to the second linear path section 80. The compensated path section 86' in this embodiment is the shortest route formed by connecting the second point 90', the first point 88' and the intersection 84', in this order.

When the path compensator 66 compensates the machining path 16, the information on the compensated machining path 16 is stored in the memory 54 together with the machining program in which the original machining path 16 is set. Hereinafter, for distinction, the machining path 15 before being compensated by the path compensator 66 may be referred to as the "original machining path 16". For the same reason, the machining path 16 compensated by the path compensator 66 may be referred to as the "compensated machining path 16".

The drive control unit 58 waits for a machining start instruction (step S3). The machine 10 may start machining as the operator manually gives a start instruction or may start machining automatically at a fixed time when the time set on the timer is reached.

The workpiece 14 of the present embodiment is processed through two stages of machining, namely "roughing" and "finishing". For each stage of machining, an appropriate offset between the wire electrode 12 and the workpiece 14 is specified taking into account the size of the wire electrode 12. In the present embodiment, the drive control unit 58 specifies the offset. Of the roughing and finishing stages, at least the finishing is repeated a multiple number of times. In the present embodiment, the finishing executed last is also described as "a final finishing step".

When the machining start instruction is given, the drive control unit 58 determines whether or not the next machining step to be executed is the final finishing step (step S4). In the present embodiment, at least the first machining step after the start of the machining cycle is a roughing step. Therefore, before the execution of the first roughing step, the drive control unit 58 may set the determination result to "NO" and make the determination at step S4 substantially unnecessary.

When the machining to be executed next is not the final finishing step, the drive control unit 58 moves the wire electrode 12 relative to the workpiece, along the compensated machining path 16 (step S5). At this time, the machining control unit 62 performs machining based on the machining condition set by the machining condition setter 60. Thereby, the workpiece 14 is gradually machined into shape along the compensated machining path 16.

FIG. 8 is a top view of the workpiece 14 that has been processed up to the machining step one step before the final finishing step.

At the point of time when the machining step one step before the final finishing step is completed, the above-mentioned protrusion 74 is formed on the surface of the thin portion 72 on the Y-axis positive side. The protrusion 74 has an approximately triangular prism-like form with a substantially right triangular base having, as vertices, the intersection 84, the first point 88 located on the line extending orthogonally to the first linear path section 78 from the intersection 84 and the second point 90 located on the machining path 16 and separated by the predetermined distance 76 from the intersection 84. A surface 74a of the protrusion 74 on the thick portion 70 side extends along the boundary line 68.

Similarly, at the point of time when the machining step one step before the final finishing step is completed, a protrusion 74' is formed on the Y-axis negative side of the thin portion 72. The protrusion 74' has an approximately triangular prism-like form with a substantially right triangular base having, as vertices, the intersection 84', the first point 88' located on the line extending orthogonally to the second linear path section 80 from the intersection 84' and the second point 90' located on the machining path 16 and separated by the predetermined distance 76 from the intersection 84'. A surface 74a' of the protrusion 74' on the thick portion 70 side extends along the boundary line 68.

FIG. 9A is a perspective view of the workpiece 14 in a state where the final finishing step has been completed.

When the drive control unit 58 determines at step S4 that the machining step to be executed next is the final finishing step, the drive control unit 58 moves the wire electrode 12 relative to the workpiece along the original machining path 16 in the final finishing step (step S6). At this time, the machining control unit 62 performs machining based on the machining condition set by the machining condition setter 60. Thereby, in the final finishing step, the protrusions 74 and 74' are removed from the workpiece 14 so that the workpiece 14 as shown in FIG. 9A is obtained as a complete product (END).

FIG. 9B is a view showing an example of the workpiece 14 that has been processed in the conventional technique.

Now, a description will be given of a problem in the related art that has occurred when the workpiece 14 is machined. In the conventional machine 10, when the wire electrode 12 linearly passes through the boundary line 68 while machining the workpiece 14, the removal amount per unit time of unnecessary parts from the workpiece 14 sharply changes, depending on the difference in thickness between the thick portion 70 and the thin portion 72.

Specifically, when the wire electrode 12 passes through the boundary line 68 on the first linear path section 78, the removal amount per unit time of unnecessary parts from the workpiece 14 sharply decreases in a transition from machining on the thick portion 70 to machining on the thin portion 72. Further, when the wire electrode 12 passes through the boundary line 68 on the second linear path section 80, the removal amount per unit time of unnecessary parts from the workpiece 14 sharply increases in a transition from machining on the thin portion 72 to machining on the thick portion 70.

The sudden change in the removal amount per unit time of unnecessary parts from the workpiece 14 means that the frequency of discharge sparks generated between the wire electrode 12 and the workpiece 14 changes significantly. When the frequency of discharge sparks changes suddenly, the average voltage of the wire electrode 12 becomes temporarily unstable. As a result, the machining accuracy temporarily degrades, and for example, streak-like flaws 92 extending in the Z-axis direction are formed on the surface of the workpiece 14, as shown in FIG. 9B.

Regarding the above problem, in the present embodiment, in the machining at the final finishing step, the amount of removal of at least part of the protrusion 74 (the protrusion 74') in the range of the unit movement in which the wire electrode 12 can move relative to the workpiece in the unit time, is included in the amount of removal per unit time. Accordingly, when the workpiece 14 is machined along the first linear path section 78 (second linear path section 80) at the final finishing step, the removal amount per unit time of the workpiece 14 across the boundary line 68 is restrained from changing abruptly.

Further, the shape of the protrusion 74 is an approximately triangular prism having a substantially right triangular base formed by connecting the intersection 84, the first point 88 and the second point 90. Therefore, as the protrusion 74 is removed from the intersection 84 toward the second point 90, the removal amount per unit time of the workpiece 14 gradually decreases. Similarly, as the protrusion 74' is removed from the second point 90' toward the intersection 84', the removal amount per unit time of the workpiece 14 gradually increases.

Thus, in the present embodiment, even after the wire electrode 12 has passed through the boundary line 68 along the original machining path 16 at the final finishing step, a sudden change of the removal amount per unit time of the workpiece 14 can be avoided.

As described above, according to the machine 10 of the present embodiment, the workpiece 14 can be machined while suppressing generation of the flaws 92 around the stepped portions of the workpiece 14.

In the present embodiment, it is preferable that the area of the surface 74a of the protrusion 74 and the area of the surface 74a' of the protrusion 74 are set so that the removal amount per unit time of the workpiece 14 is the same immediately before and after passing through the boundary line 68. Therefore, it is preferable that the path compensator 66 is configured to set the distance between the intersection 84 and the first point 88 and the distance between the intersection 84' and the first point 88' so that the removal amount per unit time of the workpiece 14 is the same immediately before and after passing through the boundary line 68. Thus, it is possible to suppress occurrence of an abrupt change in the removal amount per unit time of the workpiece 14 at the boundary line 68, in the most optimal manner.

MODIFIED EXAMPLES

Though the above embodiment has been described as one example of the present invention, it goes without saying that various modifications and improvements can be added to the above embodiment. It is apparent from the scope of claims that modes added with such modifications and improvements should be incorporated in the technical scope of the invention.

Modified Example 1-1

FIG. 10A is a top view showing a workpiece 14 that has been completed up to the machining step one step before the finishing step according to a modified example 1-1. FIG. 103 is a top view of a workpiece 14 showing another example of the modified example 1-1.

In the first embodiment (FIG. 8), the shape of the base of the protrusion 74 is substantially triangular. The shape of the base may be changed from the shape shown in FIG. 8 into those shown in FIGS. 10A and 10B. FIG. 10A shows an example where the first point 88 resides on the thick portion 70 side with respect to the intersection 84. FIG. 10B shows an example where the shape of the base of the protrusion 74 is not a substantially triangular shape but a trapezoidal shape. Also in this modified example, similarly to the first embodiment, it is possible to suppress generation of the flaws 92 on the workpiece 14.

Modified Example 1-2

In the first embodiment, the protrusions 74 and 74' are removed at the final finishing step. The protrusions 74 and 74' may be removed at a finishing step other than the final finishing step when a plurality of finishing steps are included in the machining cycle. In other words, the drive control unit 58 may move the wire electrode 12 relative to the workpiece along the compensated machining path 16 until a predetermined machining step, and then move the wire electrode 12 relative to the workpiece along the original machining path 16 at the machining steps after the predetermined machining step.

The "predetermined machining step" may include, among the plurality of machining steps, the final roughing step (the machining step one step before the first finishing step) to the finishing step one step before the final finishing step.

In finishing steps, the workpiece is machined under machining condition that is more limited than in roughing steps. Therefore, it can be said that a finishing step is less likely to generate flaws 92 than roughing steps. Additionally, the machining condition for a finishing step, which is more limited than in roughing steps, may make removing the protrusions 74 and 74' and completely tiding up the surface of the workpiece 14 during the machining process, more difficult in some cases depending on the settings of the machining condition.

From the above viewpoints, in this modified example, the removal of the protrusions 74 and 74' is allowed before the execution of the final finishing step. Thus, the risk of formation of the flaws 92 can be reduced, and the risk of traces of the protrusions 74 and 74' remaining on the finished product of the workpiece 14 can be reduced as compared to the first embodiment.

Modified Example 1-3

When the workpiece 14 is being processed by electrical discharge machining, particularly in a roughing step performed at the beginning of a machining cycle, the average voltage applied to the wire electrode 12 becomes unstable around the boundary line 68 between the thick portion 70 and the thin portion 72. Similarly, in the roughing step performed at the beginning of the machining cycle, the frequency of discharge sparks generated between the wire electrode 12 and the workpiece 14 becomes unstable around the boundary line 68 between the thick portion 70 and the thin portion 72. Therefore, by monitoring at least one of the average voltage of the wire electrode 12 and the frequency of the generated discharge sparks, it is possible to determine that the wire electrode 12 is approaching the boundary line 68.

In relation to the above, the path determination unit 64 may detect the boundary line 68 while the wire electrode 12 is moving relative to the workpiece along the machining path 16 to machine the workpiece 14. In this case, the path determination unit 64 may detect the position of the boundary line 68 based on the average voltage of the wire electrode 12 or the frequency of discharge sparks generated between the wire electrode 12 and the workpiece 14.

The average voltage of the wire electrode 12 during the relative movement of the wire electrode 12 or the frequency of discharge sparks generated between the wire electrode 12 and the workpiece 14 may be monitored by a monitoring unit that is provided for the machine 10. The monitoring unit may be included in, for example, the processor 52, as a functional unit for monitoring at least one of the average voltage of the wire electrode 12 and the frequency of discharge sparks generated between the wire electrode 12 and the workpiece 14. Alternatively, the machining control unit 62 may be configured to monitor the average voltage of the wire electrode 12 and the frequency of the discharge sparks generated between the wire electrode 12 and the workpiece 14.

When the path determination unit 64 detects the boundary line 68 while the wire electrode 12 is being moved relative to the workpiece, the path compensator 66 may compensate the machining path 16 based on the detection result. Then, when the path compensator 66 has compensated the machining path 16, the drive control unit 58 may move the wire electrode 12 relative to the workpiece along the compensated machining path 16 from that point of time, even in the middle of the relative movement of the wire electrode 12 along the machining path 16 before being compensated.

Further, after compensation of the machining path 16, the drive control unit 56 may move the wire electrode 12 relative to the workpiece along the compensated machining path 16 until the machining step one step before the final finishing step is completed. Thus, for example, even when the operator forgets to specify the boundary line 68, the machining path 16 is compensated after the start of the relative movement of the wire electrode 12. Therefore, it is possible to suppress generation of flaws 92 around the steps in the workpiece 14.

Modified Example 1-4

The path determination unit 64 may set, as the position of the boundary line 68, the position designated via the touch panel display unit 56. For example, before start of relative movement of the wire electrode 12, the machine 10 displays the CAD data stored in advance in the memory 54 on the screen of the touch panel display unit 56 together with the machining path 16 of the machining program. The operator visually checks the shape of the workpiece 14 and the machining path 16, and indicates the position of the boundary line 68 or the position of the intersection 84 by touching the screen of the touch panel display unit 56. This allows the operator to select and set the position for compensating the machining path 16 at his/her own will.

Second Embodiment

Next, a second embodiment will be described. The second embodiment relates to a machining program editor 94. The same elements as those in the first embodiment are allotted with the same reference numerals, and description thereof will be omitted as appropriate.

Figure 11:
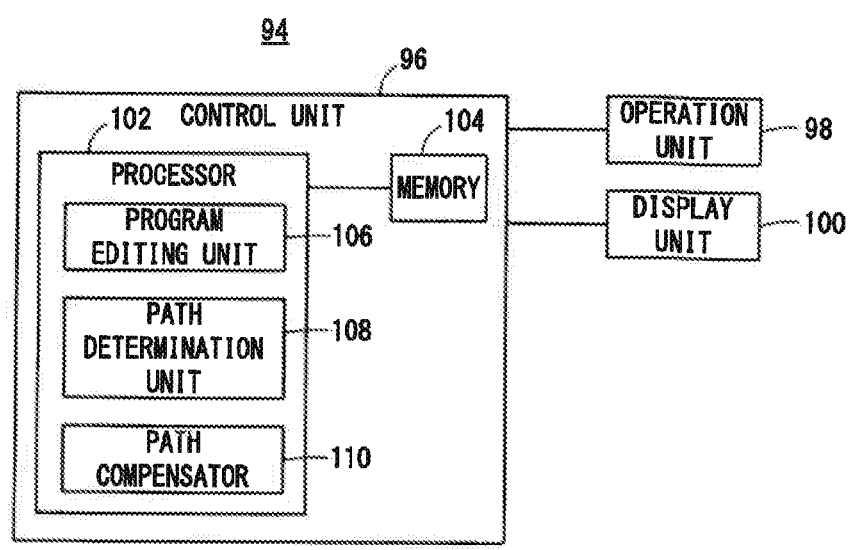
FIG. 11 is a block diagram showing a configuration of a machining program editor according to a second embodiment.

FIG. 11 is a block diagram showing a configuration of the machining program editor 94 according to the second embodiment.

The machining program editor 94 refers to a general device for editing a machining program, including creation of a new machining program, in which a machining path 16 desired by an operator is set. Hereinafter, the "machining program editor 94" is also simply referred to as the "editor 94".

The editor 94 includes a control unit 96, an operation unit 98 and a display unit 100. The operation unit 98 is, for example, a keyboard, and is used by an operator to operate the editor 94. The display unit 100 has, for example, a liquid crystal screen, and is used by an operator to confirm the details of the machining program being edited.

The control unit 96 includes a processor 102 and a memory 104. The processor 102 has, as a functional unit, a program editing unit 106 for editing a machining program in accordance with the operator's operation. The processor 102 further includes a path determination unit 108 that determines the structure of the machining path 16 set in the machining program edited by the program editing unit 106, and a path compensator 110 that compensates the machining path 16 according to the determination result from the path determination unit 108.

FIG. 12 is a flowchart for explaining an example of a processing flow of the machining program editor 94 according to the second embodiment.

Now, an example of the processing flow of the editor 94 will be described with reference to FIG. 12. To simply description, the "machining path 16" described below is the same as that of the first embodiment, and the "workpiece 14" described below has the same configuration as that of the first embodiment.

The editor 94 starts a series of processing (START) when the operator requests the editor 94 to create a new machining program or edit an existing machining program (START). In the present embodiment, it is assumed that the operator requests the editor 94 to newly create a machining program.

Upon receiving the request from the operator, the program editing unit 106 of the editor 94 creates a new editing file for a machining program (step S11). When editing of an existing machining program is requested, the existing machining program is read as an editing file. Thereafter, the program editing unit 106 edits the machining program according to operator's operation such that the machining path 16 desired by the operator is set (step S12).

At step S11 or S12, the operator inputs data relating to the shape of the workpiece 14 to the editor 94. The "data relating to the shape of the workpiece 14" is, for example, CAD format data prepared in advance by the operator prior to the work of editing the machining program. When the data relating to the shape of the workpiece 14 is input, the editor 94 stores the data in the memory 104. The input data relating to the shape of the workpiece 14 may be displayed, as appropriate, on the screen of the display unit 100 while the operator is editing the machining path 16. Thus, the operator can edit the machining path 16 while checking the shape of the workpiece 14.

After editing the machining program, the editor 94 performs a path determination process (step S13). In the path determination process, the program editing unit 106 calls the path determination unit 108. The path determination unit 108 determines whether or not the machining path 16 of the edited machining program includes a linear path section that crosses the boundary line 68 between the thick portion 70 and the thin portion 72 of the workpiece 14.

As mentioned above, the shape of the workpiece 14 herein is the same as that in the first embodiment (FIGS. 5 and 6). The machining path 16 herein is also the same as that in the first embodiment (FIG. 6). Therefore, the path determination unit 108 determines that the machining path 16 of the edited machining program "includes a linear path section crossing the boundary line 68".

When the path determination unit 108 determines that a linear path section crossing the boundary line 68 is included, the path determination unit 108 calls the path compensator 110. The path compensator 110 compensates the machining path 16 so as to form, in the thin portion 72 over a predetermined distance 76, a protrusion 74 projecting outward from the boundary line 68 (step S14). Thereby, a part of the first linear path section 78 of the machining path 16 is replaced with a compensated path section 86. Similarly, a part of the second linear path section 80 of the machining path 16 is replaced with a compensated path section 86'.

It is assumed that this compensated path section 86 is the same as that in the first embodiment. That is, the compensated path section 86 is set so as to replace a part of the first linear path section 78. The compensated path section 86 starts from the intersection 84. The compensated path section 86 further includes, as a halfway point, a first point 88 located on the outer side of the intersection 84, and includes, as an end point, a second point 90 that is a point on the first linear path section 78 in the thin portion 72 and is separated by the predetermined distance 76 from the intersection 84. In this embodiment, the first point 88 resides on the boundary line 68. Therefore, a line segment connecting the intersection 84 and the first point 88 is orthogonal to the first linear path section 78. The compensated path section 86 in this embodiment is the shortest route formed by connecting the intersection 84, the first point 88 and the second point 90 in this order.

The compensated path section 86' is similar to that of the first embodiment. That is, the compensated path section 86' is set so as to replace a part of the second linear path section 80. The compensated path section 86' ends at the intersection 84'. The compensated path section 86' further includes, as a halfway point, a first point 88' located on the outer side of the intersection 84', and includes, as a start point, a second point 90' that is a point on the second linear path section 80 in the thin portion 72 and is separated by the predetermined distance 76 from the intersection 84'. In the present embodiment, the first point 88' resides on the boundary line 68. Therefore, a line segment connecting the intersection 84' and the first point 88' is orthogonal to the second linear path section 80. The compensated path section 86' in this embodiment is the shortest route formed by connecting the second point 90', the first point 88' and the intersection 84', in this order.

The path compensator 110 outputs information on the compensated machining path 16 to the program editing unit 106. When receiving the compensated machining path 16 from the path compensator 110, the program editing unit 106 automatically edits the machining program. This automatic editing edits the machining program so that the wire electrode 12 is moved relative to the workpiece along the compensated machining path 16 until the machining step one step before the final finishing step is completed. The machining program is edited so that the wire electrode 12 is moved relative to the workpiece along the original machining path 16 at the final finishing step.

The program editing unit 106 stores the machining program thus automatically edited into the memory 104 in such a state that it can be output to the outside (step S15). Thus, the editing of the machining program and the compensation process of the machining path 16 are completed (END).

The operator inputs the machining program stored in the memory 104 to a wire electrical discharge machine 10' (hereinafter, machine 10'), and performs machining of the workpiece 14. Here, the machine 10' may not include the path determination unit 64 and the path compensator 66 included in the machine 10 of the first embodiment.

The machine 10' runs the machining program edited by the editor 94 of the present embodiment so as to form the protrusions 74 and 74' in the thin portion 72 of the workpiece 14 at the stage where the machining is completed up to the machining step one step before the final finishing step. Then, the machine 10' removes the protrusions 74 and the protrusions 74' at the final finishing step. Thus, the machine 10' can perform machining on the workpiece 14 while suppressing generation of flaws 92 around the steps of the workpiece 14 similarly to the machine 10 of the first embodiment.

As described above, according to the machining program editor 94 of the present embodiment, it is possible to edit a machining program capable of performing electrical discharge machining while suppressing generation of the flaws 92 around the steps of the workpiece 14.

Modified Example 2-1

Similarly to the modified example 1-1, the shape of the base of the protrusion 74 may be changed. For example, the path compensator 110 may compensate the machining path 16 so that the shape of the base of the protrusion 74 formed by running the edited machining program has a shape illustrated in FIG. 10A or FIG. 10B described in the modified example 1-1. Thereby, similarly to the first embodiment, it is possible to suppress generation of flaws 92 on the workpiece 14.

Modified Example 2-2

The program editing unit 106 may edit the machining program so as to cause the electrode 12 to move relative to the workpiece along the compensated machining path 16 until a predetermined machining step, and then move along the original machining path 16 at the machining steps after the predetermined machining step. The "predetermined machining step" may include, among the plurality of machining steps, the final roughing step to the finishing step one step before the final finishing step, as in the modified example 1-4.

Modified Example 2-3

The path determination unit 108 of the editor 94 may set the position designated via the touch panel display unit 56 at the path determination process (step S13), as the position of the boundary line 68. This allows the operator to select and set the position for compensating the machining path 16 at his/her own will.

Modified Example 2-4

The above embodiments and modified examples may be appropriately combined as long as no technical inconsistency occurs.

Invention Obtained from the Embodiment

Inventions that can be grasped from the above-described embodiments and modified examples will be described below.

<First Invention>

A wire electrical discharge machine (10) that machines a workpiece (14) using a wire electrode (12) includes: a drive control unit (58) configured to move the wire electrode (12) relative to the workpiece (14) along a machining path (16) set in a machining program; a path determination unit (64) configured to determine whether or not the machining path (16) includes a linear path section (78, 80) that crosses a boundary line (68) between a thick portion (70) of the workpiece (14) and a thin portion (72) of the workpiece (14), a thickness of the thin portion being smaller than a thickness of the thick portion (70) in an extending direction of the wire electrode (12); and a path compensator (66) configured to compensate the machining path (16) so as to form, in the thin portion (72) over a predetermined distance (76), a protrusion (74, 74') projecting outward from the boundary line (68) when the path determination unit determines that the linear path section (78, 80) is included.

Thereby, it is possible to provide a wire electrical discharge machine (10) that can perform electrical discharge machining on a workpiece (14) while suppressing generation of flaws (92) around steps of the workpiece (14).

The path compensator (66) may be configured to compensate the machining path (16) so as to gradually change an amount of removal per unit time of the workpiece (14) when the protrusion (74, 74') is machined and removed from the workpiece (14). Thereby, even after the wire electrode (12) has passed through the boundary line (68) along the original machining path (16), a sudden change of the removal amount per unit time of the workpiece 14 can be avoided.

The machining on the workpiece (14) may include a plurality of machining steps that perform electrical discharge machining while moving the wire electrode (12) relative to the workpiece (14) along the machining path (16), and the drive control unit (58) may be configured to move the wire electrode (12) relative to the workpiece (14) along the machining path (16) compensated by the path compensator (66) up to a predetermined machining step among the plurality of machining steps, and move the wire electrode (12) relative to the workpiece (14) along the machining path (16) before being compensated by the path compensator (66), in the machining steps after the predetermined machining step. Thus, the protrusion (74, 74') is removed at the predetermined machining step.

The predetermined machining step may be the machining step one step before a final finishing step, or a roughing step. As a result, the protrusion (74, 74') is removed at the predetermined machining step. Also, by allowing the protrusion (74, 74') to be removed at a stage prior to the final finishing step, it is possible to reduce the risk of the trace of the protrusion (74, 74') remaining on the finished workpiece (14).

The protrusion (74, 74') may have a substantially triangular shape having, as vertices, an intersection (84, 84') between the linear path section (78, 80) and the boundary line (68), a first point (88, 88') located on a line extending orthogonally to the linear path section (78, 80) from the intersection (84, 84'), and a second point (90, 90') located on the machining path (16) and separated by the predetermined distance (76) from the intersection (84, 84'). This configuration makes it possible to gradually change the amount of removal per unit time of the workpiece (14) when removing the protrusion (74, 74').

The path determination unit (64) may be configured to detect a position of the boundary line (68) based on a shape of the workpiece (14). This enables the determination unit (64) to determine whether or not the machining path (16) includes a linear path section (78, 80) crossing the boundary line (68) between the thick portion (70) and the thin portion (72).

The path determination unit (64) may be configured to detect a position of the boundary line (68) while the wire electrode (12) is moving relative to the workpiece (14) along the machining path (16) to machine the workpiece (14), based on an average voltage of the wire electrode (12), or a frequency of discharge sparks generated between the wire electrode (12) and the workpiece (14). Thereby, for example, even when the operator forgets to specify the boundary line (68), the machining path (16) can be compensated after the start of the relative movement of the wire electrode (12).

<Second Invention>

A machining program editor (94) that edits a machining program in which a machining path (16) for a wire electrode (12) of a wire electrical discharge machine (10, 10') is set, includes: a path determination unit (108) configured to determine whether or not the machining path (16) includes a linear path section (78, 80) that crosses a boundary line (68) between a thick portion (70) of a workpiece (14) and a thin portion (72) of the workpiece (14), a thickness of the thin portion being smaller than a thickness of the thick portion (70) in an extending direction of the wire electrode (12); and a path compensator (110) configured to compensate the machining path (16) so as to form, in the thin portion (72) over a predetermined distance (76), a protrusion (74, 74') projecting outward from the boundary line (68) when the path determination unit determines that the linear path section (78, 80) is included.

Thereby, it is possible to provide a machining program editor (94) that can edit the machining program so as to perform electrical discharge machining on a workpiece (14) while suppressing generation of flaws (92) around steps of the workpiece (14).

The path compensator (110) may be configured to compensate the machining path (16) so as to gradually change an amount of removal per unit time of the workpiece (14) when the protrusion (74, 74') is machined and removed from the workpiece (14). Thereby, even after the wire electrode (12) has passed through the boundary line (68) along the original machining path (16), a sudden change of the removal amount per unit time of the workpiece 14 can be avoided.

The machining program editor may further include a program editing unit (106) configured to edit the machining program. The machining on the workpiece (14) may include a plurality of machining steps that perform electrical discharge machining while moving the wire electrode (12) relative to the workpiece (14) along the machining path (16), and the program editing unit (106) may be configured to edit the machining program so as to cause the wire electrode (12) to move relative to the workpiece (14) along the machining path (16) compensated by the path compensator (110) up to a predetermined machining step among the plurality of machining steps, and cause the wire electrode (12) to move relative to the workpiece (14) along the machining path (16) before being compensated compensated by the path compensator (110), in the machining steps after the predetermined machining step. Thus, the protrusion (74, 74') is removed at the predetermined machining step.

The predetermined machining step may be the machining step one step before a final finishing step, or a roughing step. As a result, the protrusion (74, 74') is removed at the predetermined machining step. Also, by allowing the protrusion (74, 74') to be removed at a stage prior to the final finishing step, it is possible to reduce the risk of the trace of the protrusion (74, 74') remaining on the finished workpiece (14).

The protrusion (74, 74') may have a substantially triangular shape having, as vertices, an intersection (84, 84') between the linear path section (78, 80) and the boundary line (68), a first point (88, 88') located on a line extending orthogonally to the linear path section (78, 80) from the intersection (84, 84'), and a second point (90, 90') located on the machining path (16) and separated by the predetermined distance (76) from the intersection (84, 84'). This configuration makes it possible to gradually change the amount of removal per unit time of the workpiece (14) when removing the protrusion (74, 74').

The path determination unit (108) may be configured to detect a position of the boundary line (68) based on a shape of the workpiece (14). This enables the determination unit (108) to determine whether or not the machining path (16) includes a linear path section (78, 80) crossing the boundary line (68) between the thick portion (70) and the thin portion (72).

The machining program editor (94) may further comprise an operation unit (98) configured to allow an operator to operate the machining program editor, and the path determination unit (108) be configured to set, as a position of the boundary line (68), a position designated through the operation unit (98). This allows the operator to select and set the position for compensating the machining path (16) at his/her own will.

What is claimed is:

1. A machining program editor that edits a machining program in which a machining path for a wire electrode of a wire electrical discharge machine is set, the machining program editor comprising:
   a path determination unit configured to determine whether or not the machining path includes a linear path section that crosses a boundary line between a thick portion of a workpiece and a thin portion of the workpiece, a thickness of the thin portion being smaller than a thickness of the thick portion in an extending direction of the wire electrode; and
   a path compensator configured to compensate the machining path so as to form, in the thin portion over a predetermined distance, a protrusion projecting outward from the boundary line when the path determination unit determines that the linear path section is included.

2. The machining program editor according to claim 1, wherein the path compensator is configured to compensate the machining path so as to gradually change an amount of removal per unit time of the workpiece when the protrusion is machined and removed from the workpiece.

3. The machining program editor according to claim 1, further comprising a program editing unit configured to edit the machining program, wherein:
   the machining on the workpiece includes a plurality of machining steps that perform electrical discharge machining while moving the wire electrode relative to the workpiece along the machining path; and
   the program editing unit is configured to edit the machining program so as to cause the wire electrode to move relative to the workpiece along the machining path compensated by the path compensator up to a predetermined machining step among the plurality of machining steps, and cause the wire electrode to move relative to the workpiece along the machining path before being compensated by the path compensator, in the machining steps after the predetermined machining step.

4. The machining program editor according to claim 3, wherein the predetermined machining step is the machining step one step before a final finishing step, or a roughing step.

5. The machining program editor according to claim 1, wherein the protrusion has a substantially triangular shape having, as vertices, an intersection between the linear path section and the boundary line, a first point located on a line extending orthogonally to the linear path section from the intersection, and a second point located on the machining path and separated by the predetermined distance from the intersection.

6. The machining program editor according to claim 1, wherein the path determination unit is configured to detect a position of the boundary line based on a shape of the workpiece.

7. The machining program editor according to claim 1, further comprising an operation unit configured to allow an operator to operate the machining program editor, wherein the path determination unit is configured to set, as a position of the boundary line, a position designated through the operation unit.

* * * * *